Patented Nov. 21, 1939

2,180,626

UNITED STATES PATENT OFFICE 2,180,626

THERMOPLASTIC COMPOSITION AND PROCESS OF MAKING SAME

Jean Delorme, Aubiere, France, assignor to George Morrell Corporation, Muskegon, Mich., a corporation of Michigan No Drawing. Application December 13, 1937, Serial No. 179,617

4 Claims. (Cl. 260—119)

This invention is concerned with the production of a thermoplastic compound through the treatment of casein and equivalent albuminous or protein materials in such a manner as to produce a product which preferably is of a clear transparent appearance and thermoplastic in characteristics, readily molded, formed, pressed and rolled into desired forms and shapes under pressure and with the application of heat, which is capable of being very readily used in injection molding and which, either alone or with additional treatments, may be availed of in the production of a great many useful and practical articles.

This invention has been produced after long trials and experiments and has been practically carried out in connection with casein. The casein to be used is an acid casein produced by the usual sulphuric acid or equivalent acid process; or lactic casein is also readily usable. Caseins produced with the use of rennet may be used but will not produce as satisfactory a product. A concrete example of the process which I employ is to take 10 kilograms of sulphuric acid casein; 1.5 kilograms of unhydrated carbonate of soda; 10 kilograms of ordinary denatured ethyl alcohol, which alcohol does not need to be and should not be dehydrated; and 3.5 kilograms of benzyl chloride ($C_6H_5CH_2Cl$), mixing such ingredients together until they are completely and homogeneously intermixed. The containing vessel may be of copper, aluminum, glass or porcelain and should not be of iron as any production of iron salts is detrimental. The production of copper salts on the other hand is beneficial while in vessels of glass, porcelain or the like where there is no effect of the ingredients used upon the material of the vessel, the action of various ingredients upon each other pursue a completely satisfactory course.

After these ingredients in the quantities specified, or in any multiple of such quantities have been thoroughly mixed in the containing vessel, they are to stand or age for a period of time. The best time which I have found is about fourteen hours at ordinary room temperatures and in any case the temperature should be below 70° C. The time of standing or ageing may be varied. A shorter time is not destructive of the product to be produced, it will merely change the characteristics of the final product in that the product produced will not be as plastic as if the materials had aged for the longer time. At the end of the standing or ageing period, for the best results to be approximately fourteen hours, the intermixed ingredients should then be simultaneously continuously mixed and the temperature increased gradually by heating to bring the temperature to 80° C. and held at closely approximating 80° C. during the entire period of heating. The period of heating and simultaneous mixing varies between four to eight hours before the completion of all of the reactions. The satisfactory completion can be told by observing the condition of the product which, when this step of the process is completed, must have been transformed into a smooth homogeneous paste without any evidence of unconverted grains, masses or nodules in any part thereof.

While sodium carbonate has been specified as one of the ingredients used it is to be understood that potassium carbonate or ammonium carbonate or like relatively weak alkali salts are the equivalent of sodium carbonate and can be used quite as well. The use of very strong alkalis, such as caustic soda or caustic potash, is not only seriously detrimental but destructive of the product which it is desired to obtain.

A little water is required. The reaction produces a small quantity of water which in its limited amount is beneficial. In principle the amount of water which is contained in the casein might be considered initially sufficient, but all ethyl alcohols except those which with great trouble have been completely dehydrated contain small amounts of water, likewise the unhydrated alkali used, such as unhydrated carbonate of soda or ammonium carbonate or potassium carbonate will contain a very small amount of water so that there is intially a sufficient but not an excess of water. Any and all excess of water should be carefully guarded against. An excess of the alkalin metal carbonate such as sodium, potassium or ammonium carbonate does not harm but on the contrary helps, but the use of strong alkalies, such as sodium or potassium hydroxide, hydrolizes the product itself and also the casein with a production of violet or brown discolorations which are impurities and very undesirable.

At the end of from four to eight hours, or when the ingredients have been transformed into a completely homogeneous smooth paste the heating may be stopped, the mixing continued and the product allowed to cool, for example by circulating water around the vessel in which the mixing takes place. This will produce a jelly-like substance which breaks easily.

By continuing the heating after the reaction is complete the product obtained will remain but any excess of benzyl chloride which is not absorbed in the chemical reactions may be withdrawn as a gas, and the product produced will be washed with an alcohol, benzine or other solvent be a powder of gelatine character which is of benzyl chloride to remove all traces thereof and eliminate all odors. The alcohol which has been used may be separated by decanting or distillation to be later used. If one washing is not sufficient, there should be additional washings until there is a complete elimination of any unused benzyl chloride. All washings should be with cold materials having a temperature not greater than that of the atmosphere, as heat swells the product in the presence of certain materials, as alcohol for example. The washed product obtained is then dried and may be ground to a uniformity in fineness.

I have fully described the process which I have invented and have stated the preferred ingredients which are to be used in the specific quantities which I have found best, and have also specifically set forth the best temperatures and times which have been found. Considerable variation in the use of equivalents have been indicated, for example that instead of sodium carbonate other very similar alkaline carbonates, such as potassium or ammonium carbonates or the like are equally useful. There is also an equivalent for the benzyl chloride in benzyl sulphate $(C_6H_5CH_2)_2SO_4$. Likewise benzyl sulphone $(C_6H_5CH_2)_2SO_2$, may be used, though benzyl chloride appears the best and most practical so far as determined.

The product obtained is not casein. The casein has been completely transformed and changed into a compound having wholly different physical characteristics and properties and likewise the product is of a different chemical nature and properties than casein. It may be further stated that my discoveries so far have been in connection with the experimentation and work upon casein but other proteins of a similar nature I believe will react in a similar manner and my invention is not to be limited to the treatment of casein alone.

The product obtained is a particularly useful thermoplastic. In the powdered form it can be pressed under hydraulic pressure into molds subjected to the application of heat, whereupon articles are perfectly molded in a solid form and the material after such molding and heating will be of a clear transparent nature. Likewise as a thermoplastic material it is particularly useful in injection molding, that is passing the same from a nozzle with an application of heat prior to its being injected from the nozzle to soften it and reduce it to a flowing state, the injection being into a cold mold or one at ordinary atmospheric temperatures, whereupon the material filling the mold quickly solidifies to the form of the mold cavities. The product is also capable of being acted upon and treated so as to provide a clear and transparent uninflammable substitute for Celluloid in substantially all of the uses to which Celluloid and gelatine may be put. Such product may be colored to any desired shade with synthetic colors, or pigments, either mineral or organic, or wood extracts in the usual manner. Such product and process are also economical.

Having thus fully described my invention what I desire to claim and secure by Letters Patent is:

I claim:

1. The process of producing a thermoplastic compound which consists, in intermixing an acid casein, an alkali metal carbonate, ethyl alcohol and benzyl chloride ageing said mixture by allowing it to stand at normal room temperature for approximately fourteen hours and then stirring and heating the mixture to produce a thermoplastic solid capable of being heated and shaped to a desired form.

2. A gelatinous solid thermoplastic compound provided by the reaction of benzyl chloride upon casein in the presence of ethyl alcohol and an alkali metal carbonate, the proportions of the casein to the benzyl chloride by weight being approximately between two and one-half and three to one, said reaction comprising two periods, one wherein the temperature does not exceed 70° C. and without stirring, followed by a second reaction at approximately 80° C. with continuous stirring.

3. The process of producing a thermoplastic solid which consists in subjecting an acid casein to the action of benzyl chloride in the presence of ethyl alcohol and an alkali metal carbonate, first at normal room temperature and less than 70° C. for not over fourteen hours and afterward to a temperature of approximately 80° C. coupled with continuous stirring.

4. The process of producing a thermoplastic solid which consists in subjecting an acid casein to the action of a compound having a benzyl radical in the presence of ethyl alcohol and an alkali carbonate, first at normal room temperature not exceeding 70° C. for a period less than 14 hours and afterward continuously mixing the ingredients and subjecting them to a temperature of approximately 80° C. for a period of from 4 to 8 hours and until a smooth homogeneous paste is produced.

JEAN DELORME.